Aug. 9, 1960

R. W. SMITH ET AL 2,948,421

INTERLOCK AND CONTROL SYSTEM FOR THE ELEVATOR
OF A MECHANICAL PARKING GARAGE

Filed May 21, 1958

INVENTORS
ROBERT W. SMITH
ROBERT A. VAUGHAN

BY
CORBETT, MAHONEY, MILLER & RAMBO, ATTY'S.
BY

INVENTORS
ROBERT W. SMITH
ROBERT A. VAUGHAN
BY CORBETT, MAHONEY, MILLER & RAMBO, ATTY'S.

Aug. 9, 1960    R. W. SMITH ET AL    2,948,421
INTERLOCK AND CONTROL SYSTEM FOR THE ELEVATOR
OF A MECHANICAL PARKING GARAGE
Filed May 21, 1958    4 Sheets-Sheet 3

INVENTORS
ROBERT W. SMITH
ROBERT A. VAUGHAN
BY CORBETT, MAHONEY, MILLER & RAMBO, ATTY'S.
BY

United States Patent Office 2,948,421
Patented Aug. 9, 1960

2,948,421

INTERLOCK AND CONTROL SYSTEM FOR THE ELEVATOR OF A MECHANICAL PARKING GARAGE

Robert W. Smith and Robert A. Vaughan, Columbus, Ohio, assignors, by mesne assignments, to Dresser Industries, Inc., Dallas, Tex., a corporation of Delaware Filed May 21, 1958, Ser. No. 736,910

24 Claims. (Cl. 214—16.1)

This invention relates to an interlock and control system for the elevator of a mechanical parking garage. It has to do, more particularly, with an interlock and control system associated with the elevator tower of a mechanical parking garage that is supported for horizontal movement with an elevator mounted for vertical movement therein.

Mechanical parking garages of the general type indicated above usually comprise a building structure which is provided with a multiplicity of vertically superposed, laterally adjacent, vehicle-receiving stalls, in combination with a horizontally movable elevator tower structure that has vertical guide rails which carry a vertically movable elevator or platform. The elevator is thus operable to move vehicles in both vertical and horizontal planes to bring each of them into registry with a selected stall. One type of mechanical parking garage has the tower mounted on horizontal tracks at the second level in a centrally arranged elevator shaft or passageway which extends longitudinally of the building structure from one end thereof to the other. The cars or other vehicles are loaded on the elevator platform in a direction transversely of the longitudinally extending elevator shaft. By having the tower mounted for horizontal movement on the tracks at the second level, the first or ground level remains substantially unobstructed to permit the free movement of cars thereabout. To guide the elevator from the lower end of the tower to the ground level, vertical guide rail sections are mounted at a predetermined fixed position along the elevator shaft and extend downwardly from the second level to the ground level and, in effect, forming a continuation of the tower when the guide rails thereof are properly aligned with such guide rail sections. When the elevator is to be lowered to the ground level, the lower ends of the vertical guide rails on the elevator tower must be brought into exact registry with the upper ends of these lower guide rail sections. It is, therefore, necessary to provide some means for insuring that the vertical guide rails on the elevator tower and the lower fixed vertical guide rail sections be exactly aligned vertically before the elevator can be lowered from the tower towards the ground level.

It is, therefore, the main object of this invention to provide an interlock for aligning the vertical guide rails of the elevator tower and the relatively fixed lower guide rail sections and to provide a control system which will preclude downward movement of the elevator from the lower end of the elevator tower unless this interlock has properly functioned.

Another object of this invention is to provide an interlock of the type indicated which is mechanical and provides for a positive interlock and aligning of the adjacent rail sections.

Still another object of this invention is to provide a mechanical interlock which is of such a nature that it can be actuated quickly and easily by the operator of the elevator and will require no special skill by the operator.

A further object of this invention is to provide a simple control system in conjunction with the mechanical interlock and the elevator control system which will permit downward movement of the elevator to the ground level of the garage only after the rail interlock has been properly actuated.

Various other objects will be apparent.

In the accompanying drawings, a single preferred embodiment of this invention is illustrated, but it is to be understood that specific details thereof may be varied without departing from the basic principles of this invention.

Figure 1:
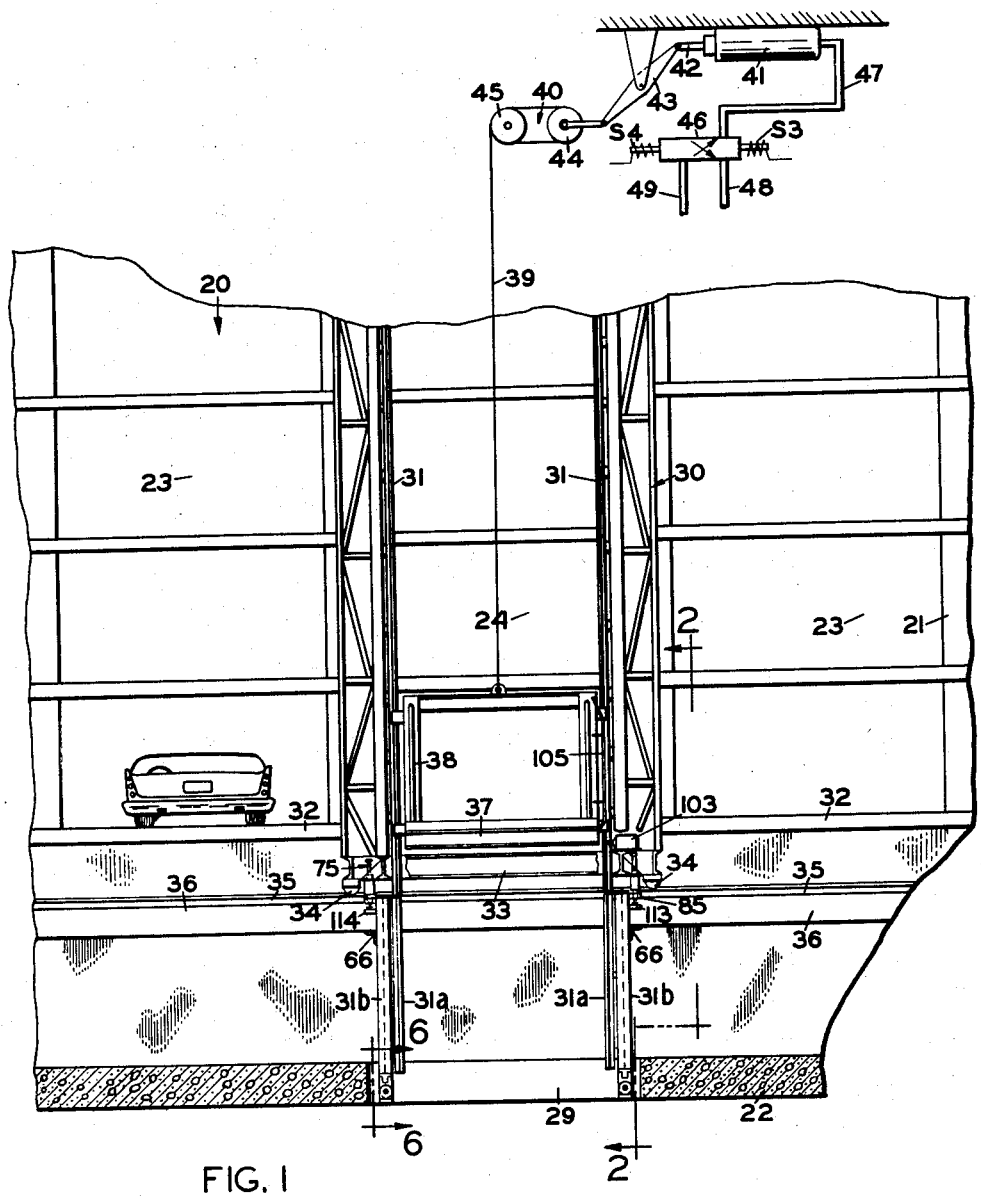
Figure 1 is a schematic vertical sectional view of a parking garage with a horizontally movable elevator tower carrying a vertically movable elevator or platform and showing the associated interlock system according to this invention.
Figure 2:
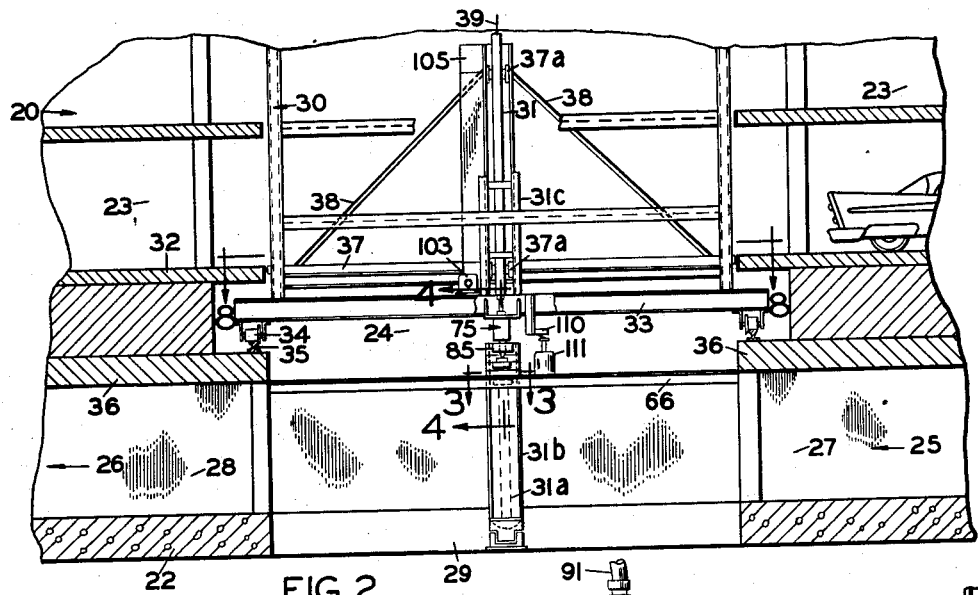
Figure 2 is a schematic vertical sectional view of a portion of the parking garage taken at right angles to that of Figure 1 along line 2—2 of Figure 1.
Figure 8:
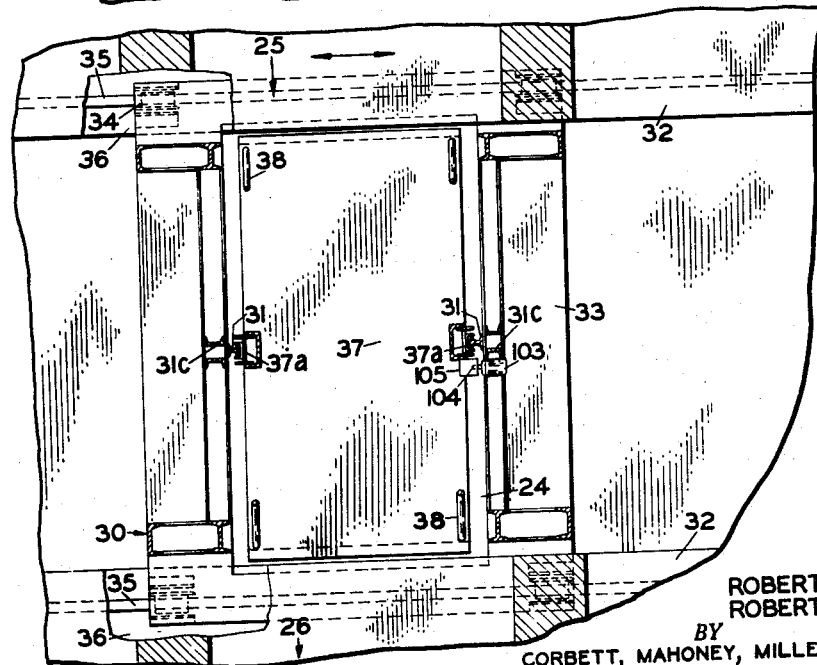
Figure 8 is a horizontal sectional view taken along line 8—8 of Figure 2.

Referring now to the drawings, and more particularly to Figures 1, 2, and 8 thereof, a parking garage building structure is illustrated generally by reference numeral 20. In the form of building structure shown, the same comprises vertically arranged outer walls 21 extending upwardly from a floor or ground level 22. The building structure further provides a multiplicity of individual parking stalls 23 preferably arranged in elevated relation to the first floor or ground level of the building structure. The individual stalls 23, at each floor level above the ground floor level, are arranged in horizontal rows or banks disposed on each side of and adjacent to a centrally arranged elevator shaft or passageway 24 which extends longitudinally of the building structure from one end thereof to the other. Advantageously, the building structure is provided at the ground level 22 thereof with one or more entrance ways 25 (Figure 8) into which automobiles or vehicles to be parked may be driven from the adjacent street or highway, and one or more exit ways 26 from which unparked or discharged vehicles may be driven from the building structure. Obviously, the entrance and exit is in a direction at right angles to the longitudinally extending elevator shaft 24. For purposes of convenience, the ground floor area of the building structure adjacent the entrance way 25 will be hereinafter referred to as the loading station 27, while the area at the ground floor level adjacent the exit way 26 will be designated as the unloading station 28. Except for the elevator pit 29 in the ground level floor 22 and the lower guide rail sections 31a at each side thereof, free unobstructed movement of vehicles on this floor is possible.

Positioned within the elevator shaftway 24 and arranged for movement longitudinally thereof in a horizontal plane is an elevator-supporting tower structure 30 which extends from the second floor upwardly the full height of the building structure. The elevator-supporting tower structure 30 comprises a base frame section 33 which may advantageously carry a plurality of spaced flanged wheels 34 mounted for rolling movement upon relatively stationary tracks 35. As illustrated in Figures 1, 2, and 8 of the drawings, the tracks 35 are mounted upon a suitable supporting structure 36 provided just below the second floor level 32 of the building structure to provide free passage area between opposite sides of the building structure at the first floor level and on either side of the elevator pit 29 and associated guide rail sections 31a.

Mounted for guided vertical movement within the elevator-supporting tower structure 30 is an elevator or platform 37. The elevator or platform 37 is provided at each side with a suitable triangular suspending framework 38 which are connected together at their apexes, and with a hoisting cable 39 adapted to be retracted and extended relative to the elevator tower structure, by a suitable hoisting apparatus indicated diagrammatically at 40 in Figures 1 and 9. The elevator 37 is guided in its vertical movement in the tower 30 by means of vertically disposed guide rails 31 at opposite sides of the tower and which extend from the second to the top floor of the garage building. The elevator 37 carries at the corresponding sides thereof sets of guide members which engage with the guide rails 31 and which are shown as the shoes 37a but may be guide rollers. Each guide shoe embraces opposite sides of the guide rail 31 and pairs of vertically spaced shoes 37a are provided at each side of the elevator on the framework 38 of the elevator. Thus, the elevator 37 is guided vertically in the tower 30. To guide the elevator below the second floor 32 to the ground floor 22, the opposed relatively fixed lower guide rail sections 31a are provided at a predetermined position along the shaft 24 at the pit 29 where the loading and unloading sections 27 and 28 are located. These guide rail sections 31a will serve, in effect, as a downward continuation of the tower 30 when it is brought into alignment with the pit 29 so that the elevator platform can be brought down to a flush position with the ground floor 22 for loading and unloading.

Advantageously, one or more of the flanged wheels 34, carried at the base section of the elevator-supporting tower 30, may be driven in rotation by appropriate drive means, not shown, in order that the elevator-supporting tower structure 30 may be driven bodily longitudinally and horizontally of the shaft or passageway 24, to thereby align the tower structure 30 and elevator platform 37 with a given vertical bank of parking stalls 23, or with the elevator pit 29 in the ground floor. At this time, as will be described more in detail later, the lower guide rail sections 31a will be aligned and locked with the tower guide rail sections 31 so that the guide shoes 37a of the elevator can move down into association therewith, passing freely off the lower ends of the rails 31 onto the associated upper ends of the rails 31.

Thus, it will be understood that the elevator 37 is arranged for simultaneous movement in both horizontal and vertical planes relative to the building structure through simultaneous operation of the drive mechanisms associated with the traction wheels 34 and the hoisting mechanisms 40, such mechanisms preferably being under the control of a single operator stationed upon the elevator 37.

Figure 9:
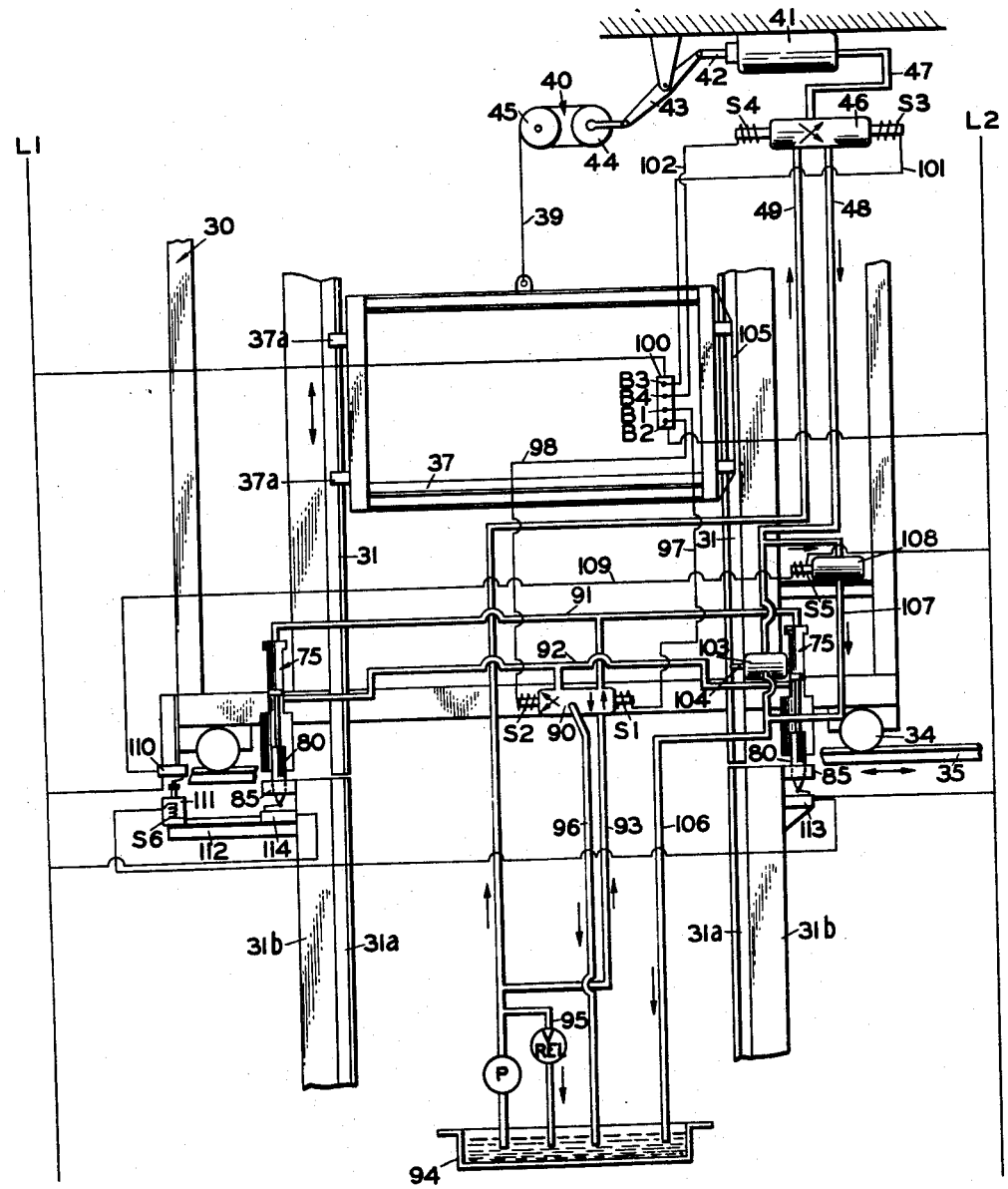
Figure 9 is a schematic view of the hydraulic and electrical control circuit for the interlock system.

As illustrated diagrammatically in Figures 1 and 9, the elevator-hoisting apparatus 40 includes a single-acting hydraulic ram or motor 41 which is provided with an extensible plunger 42 whose outer end is connected with a pivotal lever 43 which, in turn, is connected with a traveling block 44 of a suitable movement-multiplying block and tackle system embodying the hoisting cable 39 and one or more crown blocks 45. The crown block or blocks 45 are advantageously stationarily mounted in the top of the tower structure 30, while the ram 41 and its associated lever and movement-multiplying apparatus may be mounted on the tower structure along one side of the vertical columns or posts thereof to be movable horizontally in association therewith. As will be understood, vertical movement of the elevator 37 in an upward direction is accomplished by the extension of the ram plunger 42 whose movement is suitably multiplied through the associated cable-reaving system. Vertical movement of the elevator platform 37 in a downward direction is accomplished by the force of gravity and such downward movement of the elevator platform causes retraction of the plunger 42 of the ram 41.

Operation of the elevator ram or motor 41 is controlled by means of a combination hydraulic and electric circuit, illustrated diagrammatically in Figure 9. The operating circuit for the ram 41 controls the flow of hydraulic fluid to and from the cylinder of the ram, and toward this end, comprises a two-position, three-way valve 46 (Figures 1 and 9) which is operable to connect the inlet-outlet line 47 of the ram 41 either with an exhaust line 48 or with a pressure-supply line 49. The operation of this valve 46 in conjunction with the remainder of the circuit of Figure 9 will be described later in detail.

Figure 6:
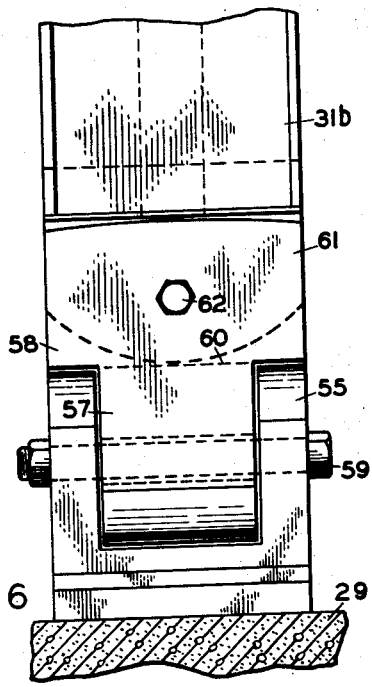
Figure 6 is a detail in side elevation of the universal mounting for the lower end of one of the lower guide rail sections taken along line 6—6 of Figure 1.
Figure 7:
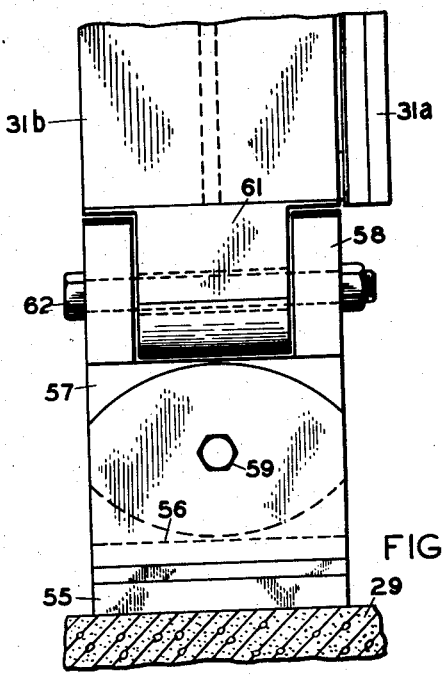
Figure 7 is a detail in side elevation of the universal mounting of Figure 6 taken at right angles to that of Figure 6.

In order to facilitate alignment of the upper ends of the lower guide rail sections 31a, which are in a fixed location along the shaft 24, with the lower ends of the tower guide rails 31 when they are moved into association by movement of the tower 30 along the shaft 24, the sections 31a are so mounted as to permit limited movement of their upper ends in a horizontal direction. Thus, although the sections 31a are in a relatively fixed position along the elevator shaft 24, their upper ends are mounted for limited movement in all directions horizontally. As indicated in Figure 8, each guide rail 31 of the tower 30 is of T cross-section and the lower rail sections 31a are of similar cross-section and size. The rails 31 are carried on vertically disposed columns 31c formed of double channels in reverse relationship and suitably secured together which are part of the tower structure. The rail sections 31a are carried by I-beam column sections 31b. To provide for the limited horizontal movement of the upper ends of the rail sections 31a, the lower end of each column section 31b is provided with a universal mounting as shown in Figures 6 and 7. It will be noted that the rail sections 31a are mounted at each side of the pit 29 along the longitudinal center line of the shaft 24. Obviously, the guide rails 31 are at the center line of the tower 30 and along the longitudinal center line of the shaft 24 or along the axis of movement of the tower in the shaft.

The universal mounting for the lower ends of each of the rails 31a comprises a U-shaped bracket member 55 which is suitably anchored to the bottom of the pit 29. This bracket 55 is provided with a flat surface 56 over which the lower concave end of a bearing tongue 57 is disposed. This tongue 57 depends from a second bracket member 58 and is pivoted to the member 55 by a transverse pivot pin 59. The member 58 is provided with a flat surface 60, at right angles to the surface 56, and a convex bearing surface on the lower end of a bearing tongue 61 is disposed over this surface 60. The tongue 61 depends from the lower end of the column section 31b. The tongue 61 is connected to the member 58 by a transverse bolt 62 which is at right angles to the bolt 59. Necessary clearances are provided between the upper edges of member 55 and the adjacent surfaces of the member 58 and between the upper edges of the member 58 and the adjacent surfaces of the member 31b. Thus, swinging of the upper end of each column section 31b in all directions away from the vertical is permitted and similar swinging of the rail section 31a is permitted.

Figure 3:
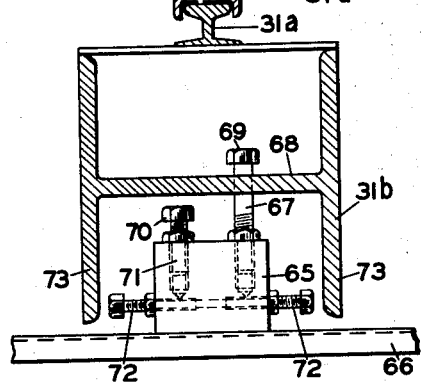
Figure 3 is a detail in horizontal section taken along line 3—3 of Figure 2 showing the positioning block means for limiting movement of the upper end of one of the lower guide rail sections.

For limiting this swinging movement, a positioning block unit is provided just below the upper end of each column section 31b. This positioning block unit is illustrated best in Figure 3 and comprises a positioning block 65 which is rigidly carried on a supporting beam 66 which extends transversely across the elevator shaft 24 (Figures 2 and 8) and is supported by the building framework. For limiting movement of the guide rail section 31a in a direction longitudinally of the shaft 24, a stop bolt 67 is adjustably anchored in the block 65 and passes slidably through the web 68 of the column section 31b. Obviously, the head 69 of the bolt limits swinging in one direction. Movement in the opposite direction is limited by contact of the web 68 with the head 70 of a stop bolt 71 which is adjustably anchored in the block 65. Movement transversely of the shaft 24 is limited by means of the stop bolts 72 which project in opposite directions from the sides of the block 65 and will engage the outwardly extending flanges 73 of the column section 31b, these screws being adjustably anchored to the block.

Thus, it will be apparent that each of the column sections 31b which carries the lower guide rail section 31a is universally pivoted at its lower end so that the upper end of the rail section 31a is free to move inward, outward, or longitudinally in either direction, relative to the elevator shaft 24. However, this movement is limited by the positioning block unit and the extent of movement in various directions can be varied by adjustment of the stop bolts 69, 70, and 72.

Figure 4:
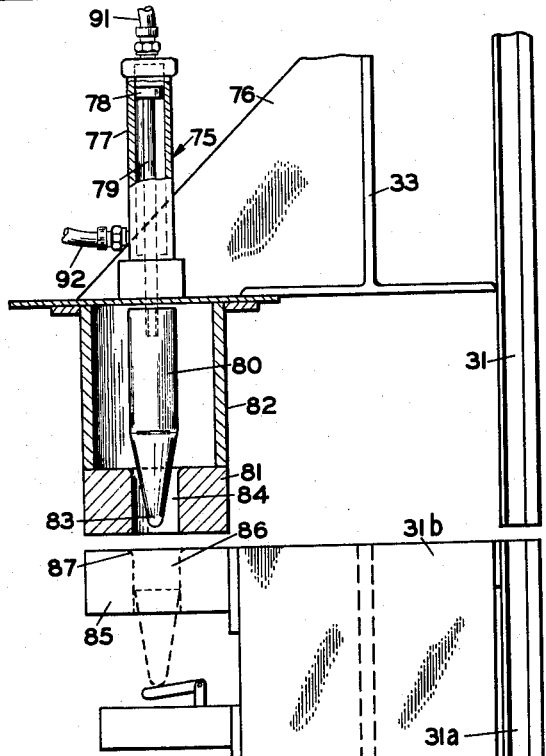
Figure 4 is a detail in vertical section taken along line 4—4 of Figure 2 showing one of the guide rail interlock hydraulic ram units and the associated guide rails.

To aid in the alignment of the upper ends of the lower guide rail sections 31a with the lower ends of the guide rails 31 and lock them in alignment, a hydraulic interlock ram unit 75, illustrated best in Fig. 4, is provided in association with the lower end of each guide rail 31. This ram unit 75 is supported by a bracket 76 which is carried at the lower side of the base frame 33 of the elevator tower. It comprises a cylinder 77 mounted on the bracket 76 and which has a piston 78 slidable therein. The piston carries a depending piston rod 79 which projects from the lower end of the cylinder 77. This rod 79 carries on its lower end an interlock plunger 80. This plunger 80 is mounted for vertical reciprocation within a guide bushing 81 which is welded on the lower end of a pipe section 82 that depends from the bracket 76, to which it is welded, and is coaxial with the bushing 81 which, in turn, is coaxial with the plunger 80. The bushing 81 has a socket 84 for snugly receiving the plunger 80. The pipe section 82 serves as a protective housing for the plunger 80 when it is in its upper or "Interlock Out" position. It will be noted that the lower end of the plunger 80 is tapered to a point 83.

The upper end of each of the lower guide rail supporting column sections 31b, above the level of the positioning block 65, is provided with a guide bushing or cup 85. This cup is provided with a socket 86 for snugly receiving the plunger 80 when it is moved to its down or "Interlock In" position at the time the sockets 84 and 86 of the respective cups 81 and 85 are in alignment. Obviously, the point 83 on the plunger 80 will serve to aid in centering the sockets 84 and 86 relatively as they approach alignment and the plunger 80 is projected downwardly into its "Interlock In" position. The upper margin of the bore 86 is chamfered at 87 to facilitate this alignment.

Figure 5:
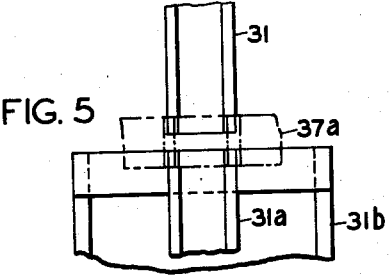
Figure 5 is a detail taken at right angles to that of Figure 4 showing the interlock and associated guide rails.

In lowering the elevator 37 from the second floor 32 to the first or ground floor 22, the operator will move the tower to a location over the pit 29 as precisely as possible. He will then actuate the interlock units 75 to engage the interlock plunger 80 with the cups 85. If the adjacent ends of the rails 31 and 31a are not in exact alignment, the plunger points 83 will aid in this alignment as they enter the sockets 86. Also, in this final alignment, the cups may move to a limited extent in any direction because of the universal mounting of the rail sections 31a. In the final engagement of the interlock units, the adjacent ends of the rails 31 and 31a will be exactly aligned so that the shoes 37a can move over the joints therebetween as indicated in Figures 4 and 5. Until the interlock units are disengaged, there will be a positive interlock between the tower and the column sections 31b and, therefore, the adjacent ends of the rail sections 31 and 31a will be locked in exact alignment so that, in effect, the rail sections 31a are downward continuations of the rail 31.

The interlock ram units 75 are so connected in the hydraulic and electric circuit of Figure 9 in relationship to the elevator ram 41 that it is impossible to lower the elevator 37 below the second floor 32 unless the guide rail sections 31a and the guide rails 31 are aligned and locked.

The ram units 75 are controlled simultaneously by means of a solenoid actuated reversing valve 90. The ram advancing areas of each of the cylinders 77 are connected in parallel through the manifold conduit 91 with one of the motor ports of the valve 90. The reversing valve 90 has an opposite motor port connected with a manifold conduit 92 leading to the ram-retracting areas of the cylinders 77. The pressure inlet port of the reversing valve 90 is connected by means of the conduit 93 with the outlet of pressure supply line 49 which leads from a hydraulic pump P that has its inlet communicating with a reservoir 94. The pump is provided with the usual by-pass line 95 and pressure relief valve V connected to the outlet line 49 below the connection of the line 93 thereto. As previously indicated, the line 49 connects to the valve 46 which controls the elevator ram 41. The exhaust port of the valve 90 is connected to an exhaust line 96 which leads to the reservoir 94. The valve 90 is of the ordinary balanced spool type and is adapted to be operated upon selected energization of the solenoids S1 and S2 so as to direct pressure from the pump P into either of the lines 91 or 92 while connecting the opposite line with the exhaust line 96. When solenoid S1 is energized, the units 75 are simultaneously actuated to "Interlock In" position whereas when the solenoid S2 is energized, the units 75 are actuated to "Interlock Out" position. The solenoid S1 is energized through a switch button B1 connected thereto by a wire 97 whereas the solenoid S2 is energized by a switch button B2 connected thereto by a wire 98. The buttons B1 and B2 are part of a switch bank 100 carried on the elevator in a position convenient for actuation by the operator, the main electric lines L1 and L2 supplying current to the switch bank. This switch bank 100 is also provided with the buttons B3 and B4 which control the valve 46. This valve is actuated by the solenoids S3 and S4, respectively, which are connected by the respective wires 101 and 102 to the buttons B3 and B4. The reversing valve 46 is of the ordinary balanced spool type and includes a pressure port connected to the line 49, an exhaust port connected to the line 48, and an inlet-outlet port connected to the line 47. Energization of the solenoid S3 will move the valve to one position to connect the line 47 to the exhaust line 48 to permit downward movement of the elevator 37 by gravity and energization of the solenoid S4 will move the valve to the opposed position to connect the pressure line 49 with the line 47 to raise the elevator.

The exhaust line 48 is connected to a two-position two-way valve 103 which is controlled mechanically by means of a plunger 104 which is energized by a cam 105 carried at one side of the elevator 37. The valve 103 is at a level just below the second floor 32 (Figure 1) and above the level of the upper ends of the guide rail sections 31a and is supported on the tower 30. The cam 105 is of elongated vertical extent and at the same side of the tower so that it will engage the plunger 104 as the elevator 37 by gravity and energization of the solenoid platform reaches the second floor level. When the plunger 104 is not engaged by the cam 105, the valve is spring-pressed into a position where it does not interrupt communication between the conduit 48 and an exhaust conduit 106 which leads to the reservoir 94, When the plunger is pressed inwardly by the cam 105, the lines 48 and 106 are disconnected.

A by-pass line 107 is connected to the exhaust lines 48 and 106, respectively, above and below the valve 103 for by-passing this valve when it is closed and this by-pass line is controlled by a valve 108. This is a two-position two-way valve which is normally held in closed position by spring means and is moved to open position by energization of a solenoid S5. The solenoid receives power through a circuit including one of the main lines L2 and a wire 109. If the valve 103 is closed by engagement of the cam 105 with the plunger 104 and the valve 108 is opened by energization of the solenoid S5, the fluid from the line 48 will by-pass through the line 107 to the line 106.

The wire 109 is connected to one side of a switch 110 which is also connected to one of the main lines L1. This switch is mechanically actuated by means of the plunger of a relay 111 which includes the solenoid coil S6. The switch 110 is carried on the tower 30 and the relay 111 is carried by an arm 112 attached to one of the column sections 31b. When the interlock units 75 are engaged, the plunger 111 will mechanically engage and close the switch 110. Both interlock units, however, must be engaged before the switch 110 is closed to energize the solenoid S5 since the solenoid coil S6 is connected in series between the lines L1 and L2 with the switches 113 and 114 that are associated with both interlock plungers 80. These switches will be mechanically closed only when the associated plungers are in interlock position, the actuating arm of each switch being located on the column section 31b directly below the associated cup 85.

The operation of the interlock and control system will be apparent from the diagram of Figure 9. Assuming that the elevator is operating in the tower from the second flor or above, the vertical movements of the elevator 37 are controlled merely by pushing the buttons B3 and B4 to cause the elevator to move down or up, respectively, in the tower along the guide rails 31. When the "Elevator Up" button B4 is pushed, the solenoid S4 will be energized so that the valve 46 is moved from vertical position and will connect the lines 49 and 47 and the ram 41 will be actuated to raise the elevator. To move the elevator 37 down in the tower 30, the "Elevator Down" button B3 is pushed and this energizes the solenoid S3 to cause the valve 46 to connect the line 47 with the exhaust line 48 to permit the elevator 37 to drop by gravity. The exhaust fluid from the ram 41 will flow through the line 48, past the valve 103 which will be open at this time and into the line 106 leading to the reservoir 94. This will be true until the elevator reaches the second floor 32 when the cam 105 will engage the plunger 104 and close the valve 103. Then, further downward movement will be precluded unless the interlocks 75 are in interlock position. If both are not in interlock position, the circuit to the solenoid S5 of the valve 108 is broken at the switch 110 and, therefore, the valve 108 is also closed. If the tower 30 is now moved along the shaft 24 to a proper position so that the lower ends of the rails 31 are in substantial alignment with the upper ends of the rail sections 31a, the operator will actuate the button B1 which is the "Interlock In" button. This will move the plunger 80 into interlock position since the solenoid S1 of the valve 90 will be energized to cause the valve to connect the pressure line 93 with the line 91 and the exhaust line 96 with the line 92. The plungers 80 moving into the cups 85 will mechanically close the switches 113 and 114, energizing the solenoid coil S6 of the relay 111 and causing the plunger thereof to mechanically close the switch 110. This energizes the solenoid S5 of the valve 108 and opens that valve, permitting by-pass of the fluid around the valve 103 so that the fluid can exhaust from the elevator ram 41 through the lines 47, 48, by-pass line 107, and the line 106 to the reservoir 94. Thus, further movement of the elevator 37 down onto the rail sections 31a to the ground level 22 will be permitted.

In the lowermost position of the elevator, the cars can be loaded thereon or removed therefrom at the respective stations 25 and 26. If the operator now pushes the "Elevator Up" button, the fluid will be supplied to the ram 41 from the line 49 and when the second floor is reached, the operator may push the "Interlock Out" button B2. This will operate the valve 90, by energizing the solenoid S2, to connect the line 92 with the pressure line 93 and the line 91 with the exhaust line 96, thereby actuating the units 75 to retract the plungers 80 from the cups 85. This will open the switches 113 and 114, deenergize the solenoid S6 and permit the plunger of the relay 111 to drop by gravity, thereby opening the switch 110 and breaking the circuit to the solenoid S5 of the valve 108 permitting closing of this valve and its associated by-pass line 107. At this time also, with the elevator moved up at least to the second floor, the cam 105 will be disengaged from the valve plunger 104 permitting opening of the valve 103. Now fluid will exhaust from the line 48 directly to the line 106 whenever the "Elevator Down" button is pushed. The elevator will not move down from the lower end of the tower because of closing of the valve 103 by the cam 105 unless the interlocks 75 are actuated to interlock condition when the lower ends of the rails 31 will be in exact alignment with the upper ends of the rail sections 31a. The units 75 can be operated at any time by the operator but the elevator cannot move off the lower ends of the guides 31 unless the plungers enter the cups 85 and close the switches 113 and 114.

It will be apparent from the above that this invention provides for a guide rail interlock and elevator control system whereby the elevator can be moved downwardly to a predetermined lower level only if an interlock system between the vertical guide rails for the elevator is in locked position at a predetermined higher level so that such guide rails are in alignment to form, in effect, continuous guides to the lower level. The interlock system is such that it can be easily actuated by the elevator operator since no special skill is required, and is positive in its locking action.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In a mechanical parking garage or the like having a plurality of vertically superposed decks including a lower deck disposed alongside of an elongated elevator shaft, an elevator tower mounted for movement horizontally along said shaft at a selected level higher than the lower deck, an elevator mounted for vertical movement on upper vertical guides in said tower relative to said decks, lower vertical elevator guides extending from the higher level to the lower deck at a predetermined location along said shaft so that the upper guides on the tower can be brought into alignment with the lower guides by movement of the tower along said shaft, an interlock structure between the upper guides and the lower guides for interlocking the upper and lower guides in alignment, means for moving the elevator vertically on said upper vertical guides of the tower, means for preventing downward movement of the elevator from the lower ends of said upper guides unless said interlock structure is in interlock condition to hold said upper and lower guides in alignment so that the elevator can move downwardly into association with said lower guides, means on the elevator for controlling said means for moving the elevator vertically, means on the elevator for controlling said interlock structure, said means for moving the elevator vertically comprising hydraulic lift means and said interlock structure being actuated by a hydraulic ram, said hydraulic lift means and said ram being connected in a hydraulic circuit, said means for preventing downward movement of the elevator comprising a normally open exhaust valve connected in said circuit to the exhaust of said lift means and actuated by downward movement of the elevator in the tower to a predetermined level at the lower end thereof to block said exhaust.

2. The combination of claim 1 in which said exhaust is provided with a by-pass having a by-pass valve connected therein which is normally closed, and means actuated by said interlock structure for opening said by-pass valve when the interlock structure is in interlock condition.

3. The combination of claim 2 in which said exhaust valve is carried by said tower and is mechanically actuated by a cam carried by said elevator and said by-pass valve is electromagnetically controlled by a switch system actuated by said interlock structure.

4. The combination of claim 3 including an electromagnetic elevator reversing valve connected in said hydraulic circuit with said lift means which in an "up" position controls the flow of fluid thereto from a pressure line of said circuit and in a "down" position controls the exhaust of fluid from said lift means to said exhaust, said control means on the elevator for controlling the means for moving the elevator vertically comprising switch means for selectively actuating said reversing valve between its up and down positions.

5. The combination of claim 4 in which the interlock ram is a double-acting ram, a reversing valve for controlling said ram and being of the electromagnetic type, said control means on the elevator for controlling said interlock structure comprising switch means for selectively moving the ram reversing valve between its "in" and "out" positions.

6. The combination of claim 5 in which said upper vertical guides and said lower vertical guides each comprises a pair of guides, a pair of interlock rams adjacent said cooperating guides, said interlock ram reversing valve being connected in said circuit to both of said rams.

7. The combination of claim 5 in which said switch system actuated by said interlock structure comprises a switch actuated by the interlock structure when it is in interlock condition, a relay controlled by said switch and including means for engaging a second switch, which is connected to said by-pass valve.

8. The combination of claim 6 in which said switch system actuated by said interlock structure comprises a pair of switches connected in series with a relay, each of said switches being associated with one of said interlock rams, said relay including means for engaging another control switch which is connected to said by-pass valve.

9. The combination of claim 8 in which each interlock ram is carried by the tower and includes a plunger which will interlock with a socket connected to a support for the associated lower guide, said plunger engaging the associated switch of said pair which is also carried by said support, said relay being carried by one of the lower guide supports and the control switch for said by-pass valve being carried by said tower.

10. The combination of claim 9 in which the interlock comprises a plunger carried by the tower and a receiving socket carried by a support for the lower guide.

11. The combination of claim 10 in which the guide is carried by the support for limited movement at its upper end.

12. The combination of claim 11 in which means is provided for universally pivoting the support at its lower end.

13. The combination of claim 12 in which stop means is provided at the upper end of the support for limiting its movement.

14. In a mechanical parking garage or the like having a plurality of vertically superposed decks including a vehicle loading and unloading deck disposed alongside of an elongated elevator shaft, a vertically disposed elevator toward having an open lower end mounted for movement horizontally along said shaft with said lower end at a predetermined level relative to said deck, an elevator mounted for vertical movement on upper vertical guides in said tower relative to said decks, lower vertical elevator guides extending downwardly from said predetermined level at a predetermined location along said shaft so that the upper guides on the tower can be brought into alignment with the lower guides by movement of the tower along said shaft, an interlock structure between the upper guides and the lower guides for interlocking the upper and lower guides in alignment, means for moving the elevator vertically on said upper vertical guides of the tower, means for preventing downward movement of the elevator from the lower ends of said upper guides unless said interlock structure is in interlock condition to hold said upper and lower guides in alignment so that the elevator can move downwardly into association with said lower guides, means on the elevator for controlling said means for moving the elevator vertically, means on the elevator for controlling said interlock structure, said means for moving the elevator vertically comprising fluid-actuated lift means and said interlock structure being actuated by a fluid-actuated ram, said lift means and said ram being connected in a fluid circuit, said means for preventing downward movement of the elevator comprising a normally open exhaust valve connected in said circuit to the exhaust of said lift means and actuated by downward movement of the elevator in the tower to a predetermined level at the lower end thereof to block said exhaust.

15. The combination of claim 14 in which said exhaust is provided with a by-pass having a by-pass valve connected therein which is normally closed, and means actuated by said interlock structure for opening said by-pass valve when the interlock structure is in interlock condition.

16. The combination of claim 15 in which said exhaust valve is carried by said tower and is mechanically actuated by a cam carried by said elevator and said by-pass valve is electromagnetically controlled by a switch system actuated by said interlock structure.

17. The combination of claim 16 including an electromagnetic elevator reversing valve connected in said circuit with said lift means which in an "up" position controls the flow of fluid thereto from a pressure line of said circuit and in a "down" position controls the exhaust of fluid from said lift means to said exhaust, said control means on the elevator for controlling the means for moving the elevator vertically comprising switch means for selectively actuating said reversing valve between its up and down positions.

18. The combination of claim 17 in which the interlock ram is a double-acting ram, a reversing valve for controlling said ram and being of the electromagnetic type, said control means on the elevator for controlling said interlock structure comprising switch means for selectively moving the ram reversing valve between its "in" and "out" positions.

19. The combination of claim 18 in which said upper vertical guides and said lower vertical guides each comprises a pair of guides, a pair of interlock rams adjacent said cooperating guides, said interlock ram reversing valve being connected in said circuit to both of said rams.

20. The combination of claim 18 in which said switch system actuated by said interlock structure comprises a switch actuated by the interlock structure when it is in interlock condition, a relay controlled by said switch and including means for engaging a second switch, which is connected to said by-pass valve.

21. The combination of claim 19 in which said switch system actuated by said interlock structure comprises a pair of switches connected in series with a relay, each of said switches being associated with one of said interlock rams, said relay including means for engaging another control switch which is connected to said by-pass valve.

22. In a mechanical parking garage or the like having a plurality of vertically superposed decks including a vehicle loading and unloading deck disposed alongside of an elongated elevator shaft, a vertically disposed elevator tower having an open lower end mounted for movement horizontally along said shaft with said lower end at a predetermined level relative to said deck, an elevator mounted for vertical movement on upper vertical guides in said tower relative to said decks, lower vertical elevator guides extending downwardly from said predetermined level at a predetermined location along said shaft so that the upper guides on the tower can be brought into alignment with the lower guides by movement of the tower along said shaft, an interlock structure between the upper guides and the lower guides for interlocking the upper and lower guides in alignment, lift means for moving the elevator vertically on said upper vertical guides of the tower, means for preventing downward movement of the elevator from the lower ends of the said upper guides unless said interlock structure is in interlock condition to hold said upper and lower guides in alignment so that the elevator can move downwardly into association with said lower guides, means on the elevator for controlling said lift means for moving the elevator vertically, means on the elevator for controlling said interlock structure, said means for preventing downward movement of the elevator comprising a first control means operatively connected to said lift means and actuated by downward movement of the elevator in the tower to a predetermined level at the lower end thereof, and second control means operatively connected to said lift means and actuated by said interlock structure when in interlock position for permitting downward movement of the elevator into association with said lower guides, said first control means being carried by said tower and being mechanically actuated by a cam carried by said elevator and said second control means being electromagnetically controlled by a switch system actuated by said interlock structure.

23. The combination of claim 22 in which said switch system actuated by said interlock structure comprises a first switch actuated by the interlock structure when it is in interlock condition, a relay controlled by said first switch and including means for engaging a second switch, said second switch being connected to said second control means.

24. The combination of claim 23 in which the interlock structure includes a plunger carried by the tower which will interlock with a socket connected to a support for the associated lower guide, said plunger engaging said first switch which is also carried by said support.

References Cited in the file of this patent

UNITED STATES PATENTS 1,768,360    Jenney _____ June 24, 1930

FOREIGN PATENTS 416,781    Great Britain _____ Sept. 18, 1934